Oct. 29, 1940.　　　A. W. MORRIS　　　2,219,427
APPARATUS FOR ORE TREATMENT
Filed March 29, 1938　　　3 Sheets-Sheet 2
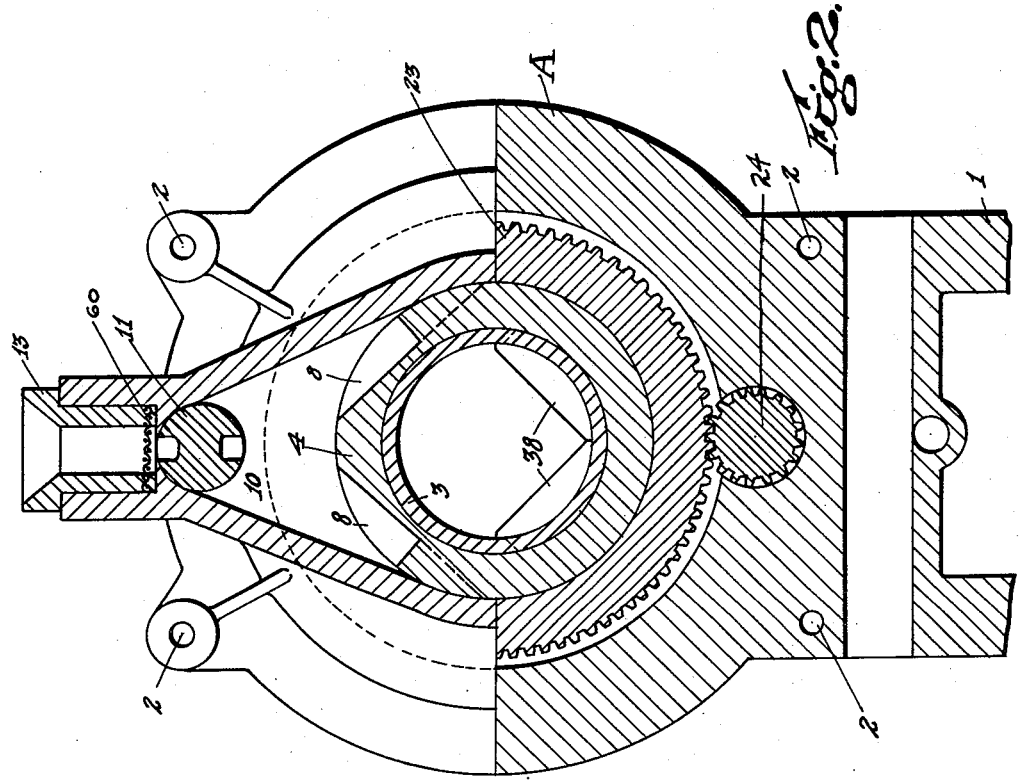
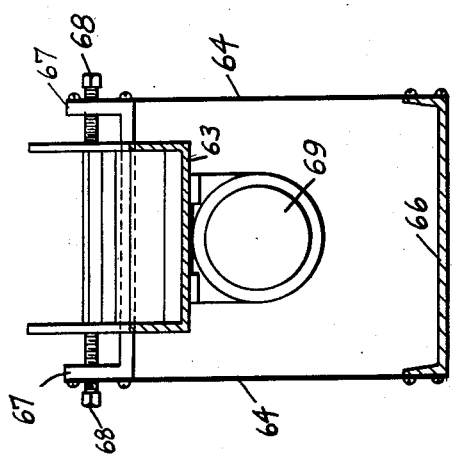
Inventor:
Albert W Morris
By Geo. W. Kennedy Jr.
Attorney Oct. 29, 1940.  A. W. MORRIS  2,219,427
APPARATUS FOR ORE TREATMENT
Filed March 29, 1938   3 Sheets-Sheet 3
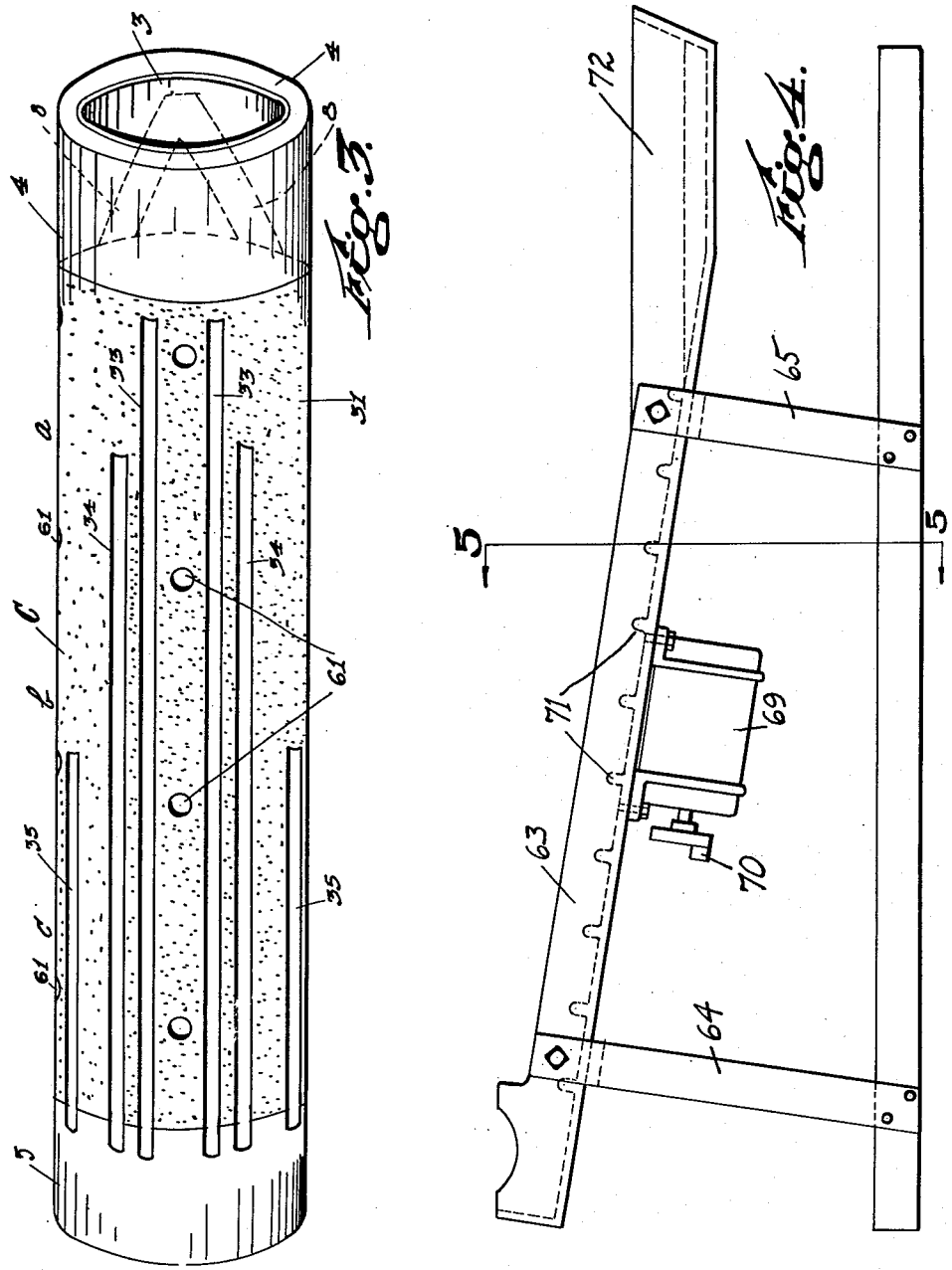
Inventor:
Albert W. Morris
By Geo. H. Kennedy Jr.
Attorney Patented Oct. 29, 1940

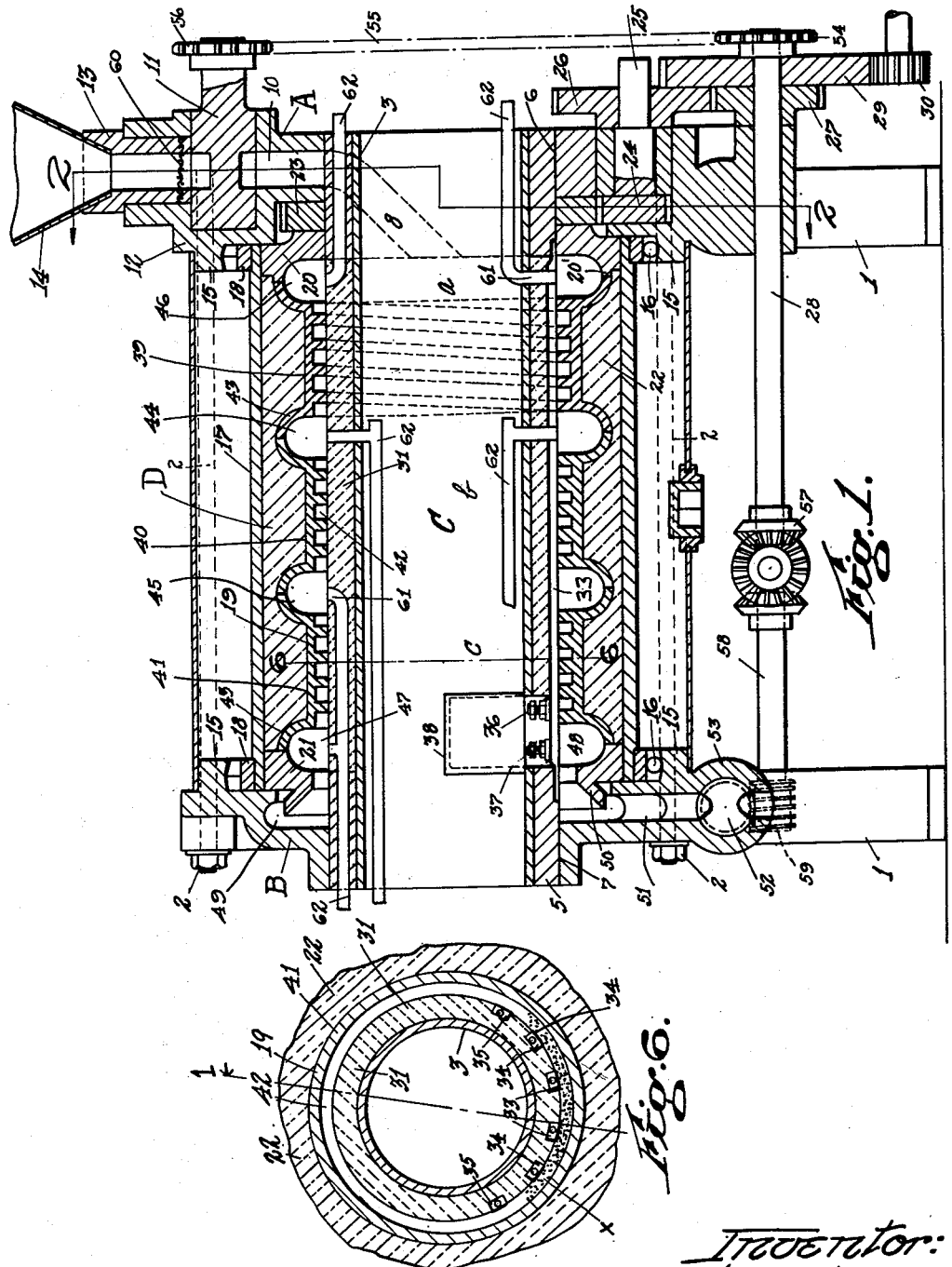

2,219,427

UNITED STATES PATENT OFFICE 2,219,427

APPARATUS FOR ORE TREATMENT

Albert W. Morris, Springfield, Mass., assignor, by mesne assignments, to Robert C. Travers, Worcester, Mass., as trustee Application March 29, 1938, Serial No. 198,782

2 Claims. (Cl. 266—24)

The present invention relates to the treatment of ores and metalliferous materials, to facilitate the separation and recovery therefrom of their precious metal content.

It is well recognized that the most serious difficulties encountered by all known extraction and recovery processes, are those imposed by the fact that in most ores a great proportion of the precious metal content is intimately combined with and incased by a variety of substances (compounds of sulphur, arsenic, tellurium, selenium, etc.) that practically prevent any efficient working of the process; in consequence, heavy losses are inevitable.

According to my invention, these difficulties are in large measure overcome by the progressive subjection of such ores to a series of roasting stages, controlled and graded as to temperature, and arranged to be carried out substantially in the absence of air; provision is also made for the controlled introduction at any stage, of reaction-producing media, to promote and hasten the desired reduction. The effect of this treatment is to drive off from the ore, at different stages of the process, the more volatile of its ingredients (sulphur, arsenic, tellurium, etc.) thus to unlock and release from the grip of these troublesome substances the minute particles of precious metal which, being thus in a free or substantially free state, are then readily segregatable by mercury amalgamation, or otherwise, from the heated granular material undergoing treatment.

My invention contemplates for the carrying out of this process, an apparatus of exceedingly compact form which does away with any need for the use of water in the extraction and recovery of the precious metal content of the ores,—thus making possible for the first time the economical working of many rich deposits in deserts or other arid areas. In this apparatus, the means for passing the ore progressively through the successive roasting stages, and for drawing off at each stage one or more of the volatilized refractory ingredients, as well as the means for introducing at any stage the desired reaction-producing media, are entirely self-contained,—as is also the means by which the so-treated material, freed from such refractory and obstructive substances, is thereupon in a highly heated condition subjected to the amalgamating action of mercury or other desired separating operation, for the efficient extraction of its precious metal content.

Other and further objects and advantages of my invention will be made apparent from the following detailed description thereof, taken in connection with the accompanying drawings which are illustrative of one of the many forms of apparatus suitable for the carrying out of said process. In said drawings, Fig. 1 is a view in longitudinal section, of certain apparatus of my invention, the section being approximately on line 1—1, Fig. 6.

Fig. 2 is a cross sectional view on the line 2—2 of Fig. 1.

Fig. 3 is a perspective underneath view of the inner member or stator of said apparatus.

Fig. 4 is a side view of a vibratory table used in the amalgamation step.

Fig. 5 is a sectional view on the line 5—5 of Fig. 4.

Fig. 6 is a sectional view on the line 6—6 of Fig. 1.

Like reference characters refer to like parts in the different figures.

I will first describe in detail the herein-illustrated apparatus which I have evolved as one of the several ways of putting my improved process into practice,—and then, in connection with the description of the operation of said apparatus, the process itself will be described.

The apparatus shown in Fig. 1, merely for illustrative purposes, provides at opposite ends the supporting standards A and B, the former at the receiving end of the apparatus and the latter at the discharge end,—both of these members having suitable feet 1, 1 adapted to rest on a supporting surface. The members A and B are held in upright position and in spaced relation to each other by suitable tie rods 2, 2.

Extending longitudinally between said members A and B and supported thereby at its ends is a hollow cylindrical stator or core, designated generally by the letter C, the wall of this core, as hereinafter described, containing and embedding the several elements which apply heat to the material undergoing treatment in the apparatus; said core, by reason of being stationary, and open from end to end, affords access at any portion of its length to the material undergoing treatment, which material, as hereinafter described, is advanced progressively, lengthwise of said core and in intimate heat-absorbing relation to the latter's exterior surface.

The core or stator C as here shown comprises an inner cylindrical metallic shell 3 open at both ends. Attached to one end of shell 3 is an annular hub member 4, and attached to the other end of shell 3 is an annular member 5,—these two hub members 4 and 5 giving the core C at each extremity a diameter the same as that of the openings 6 and 7, formed in the respective standards A and B for the support of the core. That is to say, the circular opening 6 of end member A is axially alined with a similar circular opening 7 of end member B, the two openings, by their snug engagement with the hubs 4 and 5 holding the core structure in centered position, but nevertheless allowing said structure to be withdrawn endwise from the apparatus, whenever desired, for purposes of replacement or repair.

The hub member 4 as shown in Fig. 2 is formed on its periphery with two grooves 8, 8 that extend in divergent relation from a common meeting zone at the highest point of opening 6 to the inner edge of said member. A vertical passage 10 in standard A is of downwardly divergent form and opens onto the upper ends of the two grooves 8, 8, this passage being alternately opened and closed at its upper end by a valve member 11 revolubly mounted in an enlargement or boss 12 of the standard A. Said boss 12, above said valve member 11, provides a hollow member 13, whose interior is a continuation of the passage 10, said member 13 supporting a feed hopper 14 for the material to be treated; said material, by the operation of valve 11, is allowed to pass by gravity in measured charges to the apparatus. Each charge, as admitted by the valve 11, falls through passage 10 and grooves 8, 8 into an annular receiving chamber 46, as hereinafter described, on the exterior of the core C.

The opposing faces of the standards A and B provide the concentric lateral flanges 15, 15, whose inner peripheries are adapted to receive suitable balls or rollers 16, 16 for the rotative mounting and support of a revoluble structure D surrounding and cooperating with the stator or core C. Said structure D, as here shown, comprises an outer large diameter shell 17, having secured to its end the rings 18, 18 that run on the balls or rollers 16, and an inner concentric smaller diameter shell 19 which, as hereinafter described, is preferably constructed in sections. The two shells 17 and 19 are united at their ends to provide a substantially integral annular structure by means of rings 20 and 21; the space between said shells is filled with suitable insulating material 22.

This annular structure D surrounding the removable stationary core C has its rotative support not on said core, but on the lateral flanges 15, 15 of the end members A and B. For the rotation of structure D, a suitable gear ring 23 surrounding the stationary hub 4 is attached by bolts or the like to the end ring 20. A pinion 24 in mesh with gear ring 23 is provided by a shaft 25 suitably journalled in the frame member A, this shaft 25 carrying a gear 26 which is driven by a pinion 27 secured to a shaft 28, likewise suitably journalled in the frame member A. Said shaft 28 also carries a gear 29 which is driven from a pinion 30 on the shaft of a driving motor or other prime mover,—the elements above described constituting a speed-reduction mechanism for procuring the constant rotation of the structure D at a relatively low speed, about an axis substantially concentric with that of the stationary core C.

Said stationary core structure C, comprising, as above described, the shell 3 and the hub members 4 and 5, provides, on its outer surface, the means by which heat is applied to the material undergoing treatment. To this end, as best shown in Fig. 3, the entire outer surface of shell 3, between the hub members 3 and 4, has a covering 31 of fireclay or equivalent heat-resisting material, the thickness of said covering being sufficient to make it substantially flush with the cylindrical outer surface of said hub members. Embedded in the lower half of covering 31 (below the horizontal plane of the axis of core C), are a plurality of electrical heating elements extending lengthwise of said core,—these elements being preferably of the type wherein the high-resistance wires are enclosed and shielded by a suitable metallic casing. As shown in Fig. 3, all these heating elements are attached to and supported by the inner end of the hub member 5; they extend from hub 5 for different distances along the length of the core member; for example, two of the elements, numbered 33, 33, extend practically the full length of the covering 31, and serve at their ends to heat a zone $a$ (Figs. 1 and 3) to 400° F. Another pair, numbered 34, 34, extend a somewhat shorter distance and cooperate with the pair 33, 33 to heat a zone $b$ (Figs. 1 and 3) say to 800° F. A third pair, numbered 35, 35, extend a still shorter distance, and cooperate with pairs 33 and 34 to heat a zone $c$ (Figs. 1 and 3) say to 1200° F. The binding posts 36, 36 for the connection of these several heating elements to sources of electric current are disposed in a semi-circular space or gap of the material 31, access to this space from the interior of shell 3 being obtained by an opening 37 in said shell through which the wires or conductors from a switch pawl, not shown, are led. The opening 37 is covered normally by a pair of plates 38, 38 which overlap the edges of said opening and seat by gravity against the inner surface of the shell 3, for a purpose to be hereinafter described.

The inner shell 19 of the rotary annular structure D is preferably built up from a plurality of similar sections 39, 40 and 41; obviously, a greater or lesser number of such sections may be employed, and if desired, they can be of different lengths, this depending on the desired relative spacing of the several heating zones $a$, $b$ and $c$ which occur at the junctions of these sections. As shown in Fig. 1, each section is tubular, and its inner surface is formed with a continuous helical groove or channel 42. At both ends, each section provides an outward flaring annular flange 43, of appreciably larger diameter than the intermediate helically-grooved tubular portion. When the several sections are assembled end to end and united to each other, as shown in Fig. 1, (any suitable retaining means, not shown, being employed), their meeting flanges 43, 43 cooperate to form on the interior of the annular structure D the relatively wide and deep annular recesses 44 and 45, substantially at the ends of heating zones $c$ and $b$ aforesaid. Similarly, the outer end flange 42 of section 39 cooperates with a flange 20' on end ring 20, to form the large annular recess 46 at the end of heating zone $a$, with which recess communicates the grooves 8, 8 of hub member 4. At the other end of the apparatus, the outer flange 42 of section 41 forms with the end ring 21 a similar large annular recess 47, substantially opposite the opening 37 of the core or stator C. That portion of the ring 21 which forms the outer wall of this recess 47 is appreciably spaced from the core or stator C to provide, as shown at 48, the annular channel communicating the recess 47 with an annular chamber 49 in the standard B. This chamber 49, into which the material is directed by the lip 50 of ring 21, has an exit passage 51 from its lower portion, said passage being controlled by a valve member 52 rotatably mounted in an enlargement or boss 53 of standard B.

The two valve members 11 and 52, the former controlling the admission of material to the apparatus and the latter controlling the exit of material from the apparatus, are adapted to operate in coordinated relation with each other and with the material-forwarding element D, so as to maintain substantially constant at all times the amount of material undergoing treatment. To this end, said valve members 11 and 52 are both driven in suitably timed relation to the rotation of structure D; as herein shown, the shaft 28, forming part of the drive for annular structure D, carries a sprocket wheel 54 having a drive chain 55 to connect it with a sprocket 56 on the shaft of valve 11, and said shaft 28 also serves through bevel gearing 57 for the drive of a countershaft 58, the latter having a worm drive connection 59 to the shaft of valve 52.

The material undergoing treatment is admitted in measured charges to the apparatus by the rotation of valve 11, it being understood that suitable provision is made for screening such material, as for instance by the use of a screen 60 in the passage 10. The successive charges of material admitted by valve 11 pass by gravity through the channels 8, 8 into the bottom of the annular recess 46 of the surrounding structure D, whose every revolution procures, by the helical grooving 42, a progressive endwise advancement of the accumulating fed-in material toward the other or left hand end of the apparatus. That is to say, in a given number of revolutions of structure B, any material that has been admitted to the recess 46 will have been transferred to the next recess 44,—the duration of this transfer being approximately the time of subjection of such material to the relatively-low roasting temperature of heating zone $a$, as produced (see Fig. 3) by the right hand ends of the pair of heating elements 33, 33.

In thus passing through the heating zone $a$ (and also through the subsequent zones $b$ and $c$), the ore, since it occupies only the lower portion of each convolution of the helical groove 42, is divided up (see X, Fig. 6) into a plurality of relatively small batches; each of these batches is heated to the same degree and for the same duration as every other batch, and moreover, the ore in each batch is uniformly tumbled and kept in motion, for exposure of all parts of same to the roasting treatment by the constant slow rotation of its supporting and sustaining surface, viz., the inner surface of the structure D.

It follows, from this method of exposing the material in each of the three heating zones $a$, $b$ and $c$, that such material very quickly and uniformly attains the roasting temperature that prevails in the zone through which it is passing; in other words, ore entering the zone $a$ has its temperature raised almost in a flash, to the temperature of said zone, and similarly, as the same batch of ore is carried out of recess 44 to the roasting zone $b$, it attains almost instantly the appreciably higher temperature prevailing in zone $b$. This multi-stage flash roasting of the ore is performed by my improved apparatus under conditions that are most conducive to a thorough and efficient reduction and break-down of the material,—the apparatus lending itself to a full and complete control of such conditions so as to aid and supplement the roasting operations, in the desired release of the precious metal content of the material. For example, the apparatus is for all practical purposes sealed against the ingress of any substantial quantity of air to the helical passage or channel wherein the successive roastings occur,—thus preventing any burning or undue oxidization of the ore ingredients. Of particular importance is the fact that one of the two members cooperating to provide this helical ore channel is a stationary member, open from end to end, so as to give access to the channel at any points desired, either for the introduction, in controlled amounts, of reaction-promoting media, or for draw-off of any ore ingredients that are volatilized in one or more of the roasting stages.

To this end, as shown schematically in Figs. 1 and 3, the stator or core C is provided, in opposed relation to each of the enlarged recesses 44, 45, 46 and 47 of structure D, with one or more openings 61, 61 extending through its wall, so as to afford a means of communication with the helical ore channel in the several places where the continuity of the helix is interrupted. To any of these openings may be connected the pipes or conduits 62, 62, which may enter the core C from either end; such of the openings 61 as are not so connected to pipes or conduits will, of course, be plugged up.

Such of the pipes or conduits 62 as are used for the introduction of reaction-promoting media will, of course, be equipped with control valves or cocks, not shown; such of the pipes or conduits 62 as may be used for the draw-off of volatilized ingredients will be extended to any suitable apparatus, not shown, for the condensation and recovery, when desired, of such volatilized substance, or for its discharge to the atmosphere, as the case may be. For example, it may be found desirable to create in the first flash roasting stage $a$, a reducing or non-oxidizing atmosphere; for this purpose, some inert gas or other equivalent media may be admitted in controlled quantities by the pipe or pipes 62 that communicate with the first-ore collecting recess 46. Or, if desired, one or more of the pipes 62 communicating with the recess 46 could be used for the draw-off of any substance or substances of relatively low volatility contained in the ore, that might be gasified or sublimated by the relatively low roasting temperature prevailing in the vicinity of the recess 46.

Similarly, at each of the successive recesses 44, 45 and 47, the pipe or pipes 62 in communication therewith may be used either for the admission, in gaseous, liquid, or solid form, as desired, of selected reaction-producing media, or for the draw-off of any of the ingredients of the ore that may be volatilized in whole or in part by the particular roasting temperature at that point or zone attained, or for both of these functions,—this depending largely, of course, on the nature of the ore's ingredients and the temperature available for its successive roastings. It is well known that the addition to certain ores of substances such as lime, iron, etc., is conducive to reactions during the roasting of such ores that assist in liberating various easily-volatilized ore ingredients such as sulphur, arsenic, and the like,—and in the efficient use of my improved apparatus and process, all such measures appropriate to the kind and character of the ore undergoing treatment will, of course, be availed of, it being obvious, as above stated, that the character of the ore undergoing treatment will be determinative of the uses to which the various pipe connections 62 are put.

It will be further noted that my improved apparatus makes adequate provision for the relief of any undue pressures that may be built up, from any cause, in the roasting channel; that is to say, the two plates 38, 38 that normally seal the opening 37 are seated only by their own weight, and are thus free to be lifted from their seats by any undue pressure created internally of the apparatus.

Practically any ore, after subjection to the above-described multi-stage flash roasting, under the closely-controlled conditions herein specified, will be very thoroughly reduced and broken down, as well as rendered rid of all or a major portion of those more volatile ingredients (sulphur, arsenic, tellurium, etc.) whose presence is well recognized as a definite obstacle to the extraction and recovery of the ore's precious metal content. In this favorable condition, the so-roasted and reduced ore, during or after its passage through the final roasting stage, may with particular advantage be subjected to any known extraction or recovery process, for example, mercury amalgamation for the pick-up and segregation of its free precious metal content, including, of course, all such metallics as have been released and unlocked in the preceding roasting stages. To this end, one or more of the pipes 62 that communicate with the recesses 45 or 47 may be employed for the admission to the mass of heated ore of properly-controlled quantities of mercury,—the latter, under the temperature conditions prevailing, being much more active than at lower temperatures in combining and amalgamating with the precious metal particles of the ore. Much of this mercury will discharge with the ore through the valve 52; any mercury volatilized by the relatively high temperature prevailing in this part of the apparatus can, of course, be drawn off through one or more of the pipes 62 connecting with the recess 47, and can be recovered, for reuse in the system by passage through suitable condensing apparatus, not shown.

The thoroughly reduced ore, along with mercury added thereto, which discharges in successive small quantities through the valve 52, can be handled in any suitable manner for the efficient isolation of the amalgam from the accumulating mass or body of worthless granular material. In Figs. 4 and 5 I have illustrated an apparatus, especially useful in regions where water is scarce, for efficiently handling the hot reduced materials which are discharged, as above described, through the valve 52 in the operation of my process. Such apparatus embodies as shown a trough 63, so supported as to occupy a sloping position, with its higher end directly underlying the discharge opening in the bottom of boss 53.

The support for trough 63 is here shown as provided by pairs of upright resilient members 64, 64 and 65, 65 which rise from a suitable base 66, and carry at their upper ends brackets 67, 67 whereon the trough 63 rests. These brackets carry screws 68, 68 by which to vary within suitable limits the position of the trough 63. Bolted to the underside of said trough is a small motor 69, whose shaft carries eccentrically a weight or enlargement 70.

The motor 69 being thus unbalanced, its operation, due to the flexibility of the trough supports 64, 64 and 65, 65, causes said trough to vibrate laterally at a rapid rate. Hence the reduced material mixed with mercury, that progressively discharges into the upper end of said trough, is subjected to a thorough shaking back and forth as it passes gradually downward along the trough's bottom, the latter being provided at suitable intervals with transverse riffles or obstructions 71, 71. Behind these riffles gradually collects the heavier amalgam, that settles toward the bottom of the shaking trough,—thus isolating said amalgam progressively from the lighter sands and worthless ingredients that pass over the riffles and discharge finally over the wall of a lower chamber 72, wherein is collected any amalgam that happens to get past the riffles.

I claim:

1. In apparatus for the treatment and reduction of ores and metalliferous materials, a stationary inner member, an outer member providing a helical ore channel surrounding said inner member, said outer member also having spaced recesses communicating with said channel at spaced points, means for rotating said outer member to cause progressive advance on said inner member of ore fed into said channel, heating means carried by said inner member and arranged to provide, in the endwise progress of the ore, a series of roasting zones of increasing intensity, said recesses marking the ends of the successive zones, means for sealing said channel against any substantial ingress of air, and means communicating with said recesses from said inner member for withdrawing ore ingredients rendered volatile in any of said roasting zones.

2. In apparatus for the treatment and reduction of ores and metalliferous materials, a stationary inner member, an outer member providing a helical ore channel surrounding said inner member, said outer member also having a plurality of spaced recesses communicating with the helical channel at spaced points along its length, means for rotating said outer member to cause progressive advancement along said inner member of ore into said channel, and heating means carried by said inner member and arranged to provide, in the endwise progress of the ore, a series of roasting zones of increasing intensity, the ends of the ones being coincident substantially with the recesses.

ALBERT W. MORRIS.